US010826939B2

United States Patent
Hodgman et al.

(10) Patent No.: US 10,826,939 B2
(45) Date of Patent: Nov. 3, 2020

(54) BLENDED HONEYPOT

(71) Applicant: Rapid7, Inc., Boston, MA (US)

(72) Inventors: Roy Hodgman, Cambridge, MA (US); Derek Abdine, Rancho Palos Verdes, CA (US)

(73) Assignee: Rapid7, Inc., Boston, MA (US)

( * ) Notice: Subject to any disclaimer, the term of this patent is extended or adjusted under 35 U.S.C. 154(b) by 230 days.

(21) Appl. No.: 15/874,989

(22) Filed: Jan. 19, 2018

(65) Prior Publication Data

US 2019/0230124 A1 Jul. 25, 2019

(51) Int. Cl.
*H04L 29/06* (2006.01)
*H04L 29/08* (2006.01)

(52) U.S. Cl.
CPC ...... *H04L 63/1491* (2013.01); *H04L 63/1433* (2013.01); *H04L 67/1036* (2013.01); *H04L 67/12* (2013.01)

(58) Field of Classification Search
CPC . H04L 63/1491; H04L 67/12; H04L 67/1036; H04L 63/1433
See application file for complete search history.

(56) References Cited

U.S. PATENT DOCUMENTS

| | | | | |
|---|---|---|---|---|
| 9,578,055 B1* | 2/2017 | Khanal | ............... | H04L 63/1458 |
| 9,602,536 B1* | 3/2017 | Brown, Jr. | .......... | H04L 63/1491 |
| 10,079,024 B1* | 9/2018 | Bhimanaik | ............. | G10L 17/06 |
| 10,110,629 B1* | 10/2018 | Kruse | ................ | H04L 63/1491 |
| 10,574,697 B1* | 2/2020 | McClintock | ........ | H04L 63/1491 |
| 2003/0233567 A1* | 12/2003 | Lynn | ................... | H04L 41/0893 726/23 |
| 2006/0161982 A1* | 7/2006 | Chari | ...................... | G06F 21/53 726/23 |
| 2008/0018927 A1* | 1/2008 | Martin | .............. | H04W 12/1206 358/1.15 |
| 2008/0141374 A1* | 6/2008 | Sidiroglou | ............ | G06F 21/554 726/23 |
| 2009/0025089 A1* | 1/2009 | Martin | .................... | G06F 21/55 726/28 |
| 2009/0037983 A1* | 2/2009 | Chiruvolu | ............... | G06F 21/31 726/4 |
| 2009/0328216 A1* | 12/2009 | Rafalovich | ......... | H04L 43/0876 726/23 |
| 2014/0096229 A1* | 4/2014 | Burns | ................. | H04L 63/1491 726/15 |
| 2015/0047032 A1* | 2/2015 | Hannis | ................ | H04L 63/1416 726/23 |
| 2015/0121529 A1* | 4/2015 | Quinlan | .............. | H04L 63/1491 726/23 |
| 2017/0134405 A1* | 5/2017 | Ahmadzadeh | ...... | H04L 63/1416 |

(Continued)

OTHER PUBLICATIONS

Scott, Charles "Designing and Implementing a Honeypot for a SCADA Network", Jun. 2014, SANS Institute, 39 pages. (Year: 2014).*

*Primary Examiner* — Michael Pyzocha
(74) *Attorney, Agent, or Firm* — Danielson Legal LLC (57) ABSTRACT

Methods and systems for monitoring activity on a network. The systems may include a host computer executing a non-honeypot service. The host computer may also include a control module configured to enable or disable a honeypot service on the host computer in response to at least one of computational resource availability and configured tolerance for degraded service.

16 Claims, 3 Drawing Sheets

(56) References Cited

U.S. PATENT DOCUMENTS

| | | | |
|---|---|---|---|
| 2017/0163682 A1* | 6/2017 | Yu | H04L 63/1491 |
| 2017/0223052 A1* | 8/2017 | Stutz | H04L 63/1416 |
| 2017/0244748 A1* | 8/2017 | Krause | H04L 63/20 |
| 2017/0302683 A1* | 10/2017 | Kawauchi | G06F 21/566 |
| 2018/0097803 A1* | 4/2018 | Iwanir | H04L 63/0823 |
| 2018/0103061 A1* | 4/2018 | Allen | H04L 63/1416 |
| 2018/0159701 A1* | 6/2018 | Krause | H04L 61/2521 |
| 2018/0262529 A1* | 9/2018 | Allen | G06F 16/245 |
| 2018/0375897 A1* | 12/2018 | Kawasaki | H04L 63/1491 |
| 2019/0020683 A1* | 1/2019 | Haerterich | H04L 63/1441 |
| 2019/0058733 A1* | 2/2019 | Wright | H04L 63/1491 |
| 2019/0273751 A1* | 9/2019 | Boss | H04L 63/1416 |

* cited by examiner

BLENDED HONEYPOT

TECHNICAL FIELD

Embodiments described herein generally relate to systems and methods for monitoring activity on a network and, more particularly but not exclusively, to systems and methods for monitoring activity on a network using honeypot devices and services.

BACKGROUND

Honeypots and honeypot services exist today in various commercial, open source, and proprietary capacities. Information describing how threat actors move through a network is important to security teams and cyber incident responders. Honeypots can, for example, detect threat actors as they scan network devices and make specific login attempts.

However, threat actors can and do avoid network devices once they identify them as honeypots. Accordingly, honeypots are essentially useless once identified, as threat actors have no reason to interact with honeypots and are in fact discouraged from doing so.

A need exists, therefore, for methods and systems for monitoring activity on a network that overcome this disadvantage of existing honeypots.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a system for monitoring activity on a network. The system includes at least one host computer on the network configured to execute a non-honeypot service, wherein the at least one host computer includes a control module configured to enable or disable a honeypot service in response to at least one of computational resource availability, configured tolerance for degraded service, and acceptable risk.

In some embodiments, the control module is further configured to configure a level of interaction provided by the honeypot service. In some embodiments, the control module configures the level of interaction provided by the honeypot service in response to an attack on the at least one host computer. In some embodiments, the system further includes a configuration manager in communication with the at least one host computer permitting an operator to configure the level of interaction provided by the honeypot service.

In some embodiments, the at least one host computer is configured to communicate instructions regarding a deployment of a honeypot service on another host computer in response to an attack on the at least one host computer.

In some embodiments, the honeypot service on the at least one host computer is configured to forward traffic from the honeypot service to a second host computer in an isolated environment.

In some embodiments, the honeypot service is executed without escalated privileges on the at least one host computer.

In some embodiments, the honeypot service and the non-honeypot service share an assigned port, and the control module determines which of the honeypot service and the non-honeypot service is configured to communicate using the assigned port.

In some embodiments, the honeypot service is configured to customize template content for its communications with a threat actor. In some embodiments, the template content is selected from the group consisting of Telnet banners, SMB banners, database versions, and database schemas.

According to another aspect, embodiments relate to a method for monitoring activity on a network. The method includes executing, using at least one host computer on the network, a non-honeypot service; and enabling or disabling, using a control module, a honeypot service on the at least one host computer in response to at least one of computational resource availability, configured tolerance for degraded service, and acceptable risk.

In some embodiments, the method further includes configuring, using the control module, a level of interaction provided by the honeypot service. In some embodiments, the control module configures the level of interaction provided by the honeypot service in response to an attack on the at least one host computer. In some embodiments, the method further includes permitting, using a configuration manager in communication with the at least one host, an operator to configure the level of interaction provided by the honeypot service.

In some embodiments, the method further includes communicating, using the at least one host computer, instructions regarding a deployment of a honeypot service on another host computer in response to an attack on the at least one host computer.

In some embodiments, the method further includes forwarding traffic from the honeypot service to a second host computer in an isolated environment.

In some embodiments, the honeypot service is executed without escalated privileges on the at least one host computer.

In some embodiments, the honeypot service and the non-honeypot service share an assigned port, and the control module determines which of the honeypot service and the non-honeypot service is configured to communicate using the assigned port.

In some embodiments, the method further includes customizing, using the honeypot service, template content for its communications with a threat actor. In some embodiments, the template content is selected from the group consisting of Telnet banners, SMB banners, database versions, and database schemas.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Network devices may be recognized as honeypots relatively quickly by threat actors. For example, network devices with all ports open may indicate that the network device is a honeypot. As discussed above, honeypots lose their value once they have been identified by threat actors, as threat actors will then avoid known honeypots. However, threat actors cannot avoid the infrastructure they are actually looking to use, which makes that infrastructure a favorable place to host honeypot services.

Various embodiments described herein therefore deploy a honeypot service on a non-honeypot machine to provide a configurable, blended honeypot. A blended honeypot is therefore a machine that is not primarily a honeypot. This makes it more difficult for a threat actor to determine if a host computer is a genuine target for exploitation or potentially a honeypot. Additionally, the use of blended honeypots may deter threat actors from attacking a host computer running actual production services out of fear that it may be a blended honeypot or otherwise running honeypot services.

Figure 1:
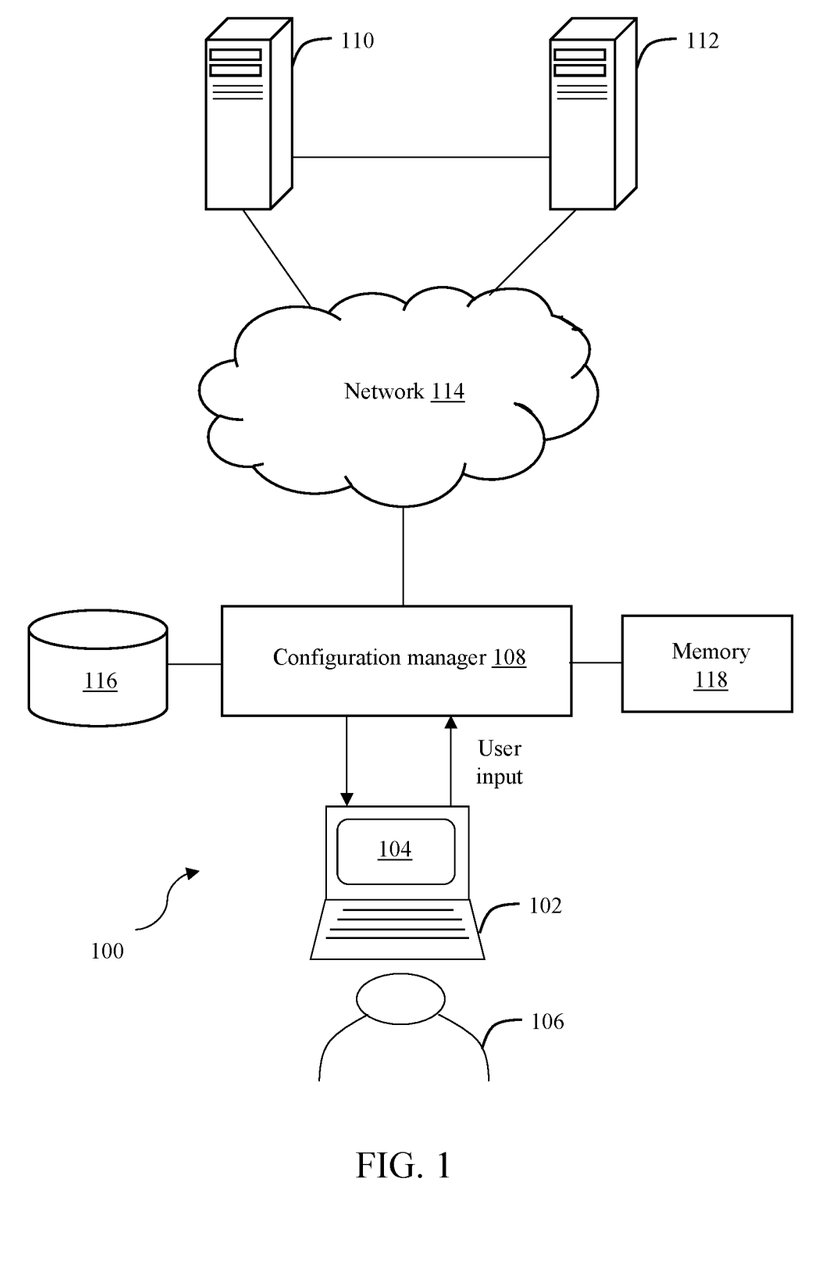
FIG. 1 illustrates a system for monitoring activity on a network in accordance with one embodiment.

FIG. 1 illustrates a system 100 for monitoring activity on a network in accordance with one embodiment. The system 100 may include a user device 102 executing a user interface 104 that is accessible by an operator 106.

The user device 102 may be any suitable device that can execute the user interface 104 to accomplish the features of various embodiments described herein. The user device 102 may be configured as a PC, laptop, tablet, smartphone, smartwatch, or the like.

The user interface 104 may be any suitable software program or application that enables the operator 106 to monitor activity on one or more networks and/or issue instructions regarding the deployment of a honeypot and non-honeypot services. The operator 106 may be an IT security personnel or administrator, for example. The operator may also view data regarding threat actor behavior using the user device 102.

The user device 102 may be in operable communication with a configuration manager 108. The configuration manager 108 may be in communication with one or more host computers 110 and 112, which may each or collectively function as a blended honeypot, over one or more networks 114. The configuration manager 108 may further be in communication with one or more databases 116 and memory 118.

The network(s) 114 may link the various devices with various types of network connections. The network(s) 114 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 114 may also comprise, include, or interface to any one or more of a Wireless Application Protocol (WAP) link, a Wi-Fi link, a microwave link, a General Packet Radio Service (GPRS) link, a Global System for Mobile Communication G (SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The host computers 110 and 112 may be non-honeypot machines that execute a set of services including configurable levels of honeypot services. Accordingly, the host computers 110 and 112 may provide legitimate (e.g., production) services as well as honeypot services to fool a threat actor into thinking the host computer 110 or 112 is not a honeypot. Additionally, the mere possibility that a host computer may be running honeypot services may in and of itself be sufficient to deter threat actors from interacting with the host computer.

The one or more databases 116 may store data regarding various host computers. The one or more databases 116 may also store data regarding honeypot services and non-honeypot services used to customize the hosts 110 and/or 112.

The memory 118 may be L1, L2, L3 cache or RAM memory configurations. The memory 118 may include non-volatile memory such as flash memory, EPROM, EEPROM, ROM, and PROM, or volatile memory such as static or dynamic RAM, as discussed above. The exact configuration/type of memory 118 may of course vary as long as instructions for deploying and managing the host computers 110 and/or 112 can be executed.

Figure 2:
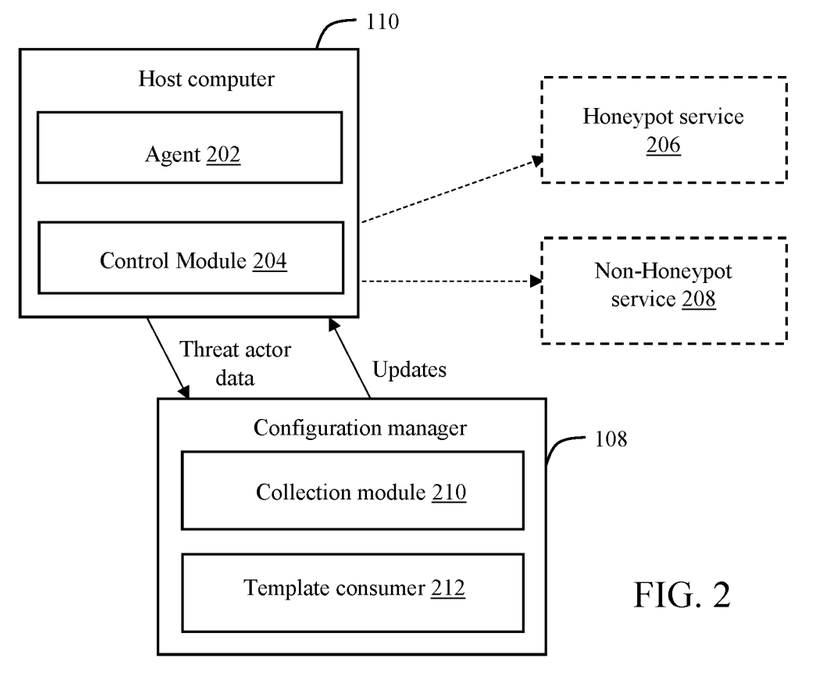
FIG. 2 illustrates a host computer of FIG. 1 executing a honeypot service and a non-honeypot service in accordance with one embodiment.

FIG. 2 illustrates the host computer 110 of FIG. 1 in communication with the configuration manager 108. The host computer 110 is illustrated as including an agent 202 and a control module 204.

The agent 202 may be deployed on the host 110 to manage honeypot services 206 and non-honeypot services 208. The agent 202 may be tasked with, for example, interacting with the configuration manager 108, managing the lifecycle of emulated honeypot services 206 and non-honeypot services 208, and configuring network traffic rules on the host computer 110.

The control module 204 may hook system network socket bindings on the host 110 to detect when legitimate, non-honeypot system services (e.g., SSH) want to listen on a socket. Accordingly, the agent 202 can stop any emulated service that is currently bound to the socket, thereby yielding the socket to the legitimate service. In other words, the honeypot service 206 and the non-honeypot service 208 may share an assigned port, and the control module 204 may determine which of the honeypot service 206 and the non-honeypot service 208 is configured to communicate using the assigned port at a given point in time.

Notably, the honeypot services 206 run in tandem with non-honeypot services 208 on the same computer instead of isolated on its own machine with its own IP address. Accordingly, the honeypot services 206 are more difficult to detect as they are deployed along with and concealed by other non-honeypot 208 services.

In some embodiments, there may be a plurality of host computers such as host computer 110 on the network that each can execute both honeypot services and non-honeypot services. Each machine may host its own production services (e.g., SSH, SQL, etc.) selected from the production services hosted by neighboring machines so as to better conceal the true nature of the blended honeypot.

For example, a host computer may execute one or more honeypot services 206 and one or more non-honeypot services 208. In a typical network, some servers may have been configured to provide, e.g., SQL services but not SSH services, while others may provide SSH services but not SQL services and so on.

The host computer 110 may therefore be configured to deploy an emulated SSH honeypot service (i.e., honeypot service 206) while also running a production SQL service (i.e., non-honeypot service 208). In another embodiment, the host computer 110 may deploy an emulated SQL honeypot service while also running a production SSH service. Thus, from the perspective of a threat actor, the devices on a network present a consistent set of open ports and available services.

When one or more of these blended honeypots are deployed with multiple host computers, someone unfamiliar with the network could conclude that all of the computers and their services are roughly similar. When a threat actor subsequently initiates a port scan, for example, the threat actor may inadvertently engage an emulated honeypot service instead of a production service.

The host computers can be configured during installation to subsequently execute certain non-honeypot services and honeypot services. This setup may be favorable for networks that are not easy to access, for example.

Additionally or alternatively, the host computers may be configured dynamically. For example, the control module 204 may periodically receive update instructions from the configuration manager 108 to change the honeypot and/or non-honeypot services executing on a particular machine.

The deployment of honeypot services 206 on non-honeypot host computers 110 therefore offers several options for the dynamic deployment and customization of services to achieve improved security. For example, the deployment of the honeypot services 206 may be adjusted based on the environment and/or the needs of an operator 106. Based on a variety of factors such as, but not limited to, computational resource availability, tolerance for degraded service, tolerance for potentially inviting threat actors to interact with network devices, etc., the services 206 and/or 208 may be dynamically enabled or disabled.

As another example, the control module 204 and/or the configuration manager 108 may adjust the level of interaction provided by the host 110. Based on at least the factors described above, the level of interaction provided by the host computer 110 and, namely, the services 206 and 208 can be scaled up or down. For example, the host computer 110 or any of the honeypot services 206 thereon may run in a purely observational mode (e.g., in which it accepts network connections but does nothing else), in a high interaction mode (e.g., in which it may attempt to simulate full network service(s) to entice an attacker to reveal intentions and techniques), or some hybrid thereof.

As yet another example, the host computer 110 may be modified based on the tolerance for running honeypot services 206 and the accompanying risk of allowing threat actors to have access to a system. The host computer 110 may be dynamically tuned from a security point of view by intentional action by the operator 106 or automatically by the control module 204 or the configuration manager 108.

For example, the operator 106 may modify the deployment of blended honeypots in the network through the user interface 104. Additionally, the configuration manager 108 may execute instructions stored on the memory 118 regarding how to react to an increase in attack behavior and to modify other blended honeypots on the network 114. In some cases, for example, more instances of honeypots (blended or otherwise) may be deployed to certain network locations to entice or study an active threat actor. In other cases, some honeypots may be shut down to reduce the attack surface area.

The configuration manager 108 may include a collection module 210 for collecting production configuration data from a variety of sources. This collected production configuration data may relate to the configuration of other non-honeypot services in the network. Accordingly, the configuration manager 108 may use this data to issue commands or updates to the control module 204. The control module 204 may use this data to instruct the host computer 110 to execute honeypot and/or non-honeypot services while nonetheless looking benign or otherwise similar to other devices and/or services in the network.

For example, the collection module 210 may collect configuration information of surrounding devices such as banners collected by Telnet, NMap, or Netcat scanners. Other information collected may include file shares from a variety of sources. This information may be collected by network scans and imports from asset inventory software (e.g., via any suitable API or installed agent).

The configuration manager 108 may also include a template consumer 212 configured to consume system or operator-created template content. This template content may be useful when emulating a non-honeypot production service by including templates for messages and actions consistent with those of the desired type of non-honeypot production service. This may help make the host computer 110 and, more specifically, the honeypot emulated services 206 appear more production-like with minor variances where the template allows such variances.

As mentioned above, executing honeypot services in tandem with non-honeypot services is not without risk. However, the systems and methods of various embodiments described herein may cycle the honeypot services 206 from time to time and/or disconnect the honeypot services 206 after a certain set of actions to address this problem.

Users may have to address situations in which threat actors compromise at least one honeypot service 206 and, depending on security settings of the host computer 110, situations in which threat actors then have access to non-honeypot services 208, the host 110 itself, or the entire network 114 or system 100. Once operating in the system 100, a threat actor can cause damage, steal information, escalate their privileges, or perform other types of malicious acts.

Accordingly, the non-honeypot services 208 may be fortified against threat actors that escape emulated honeypot services 206 by at least two techniques. First, an emulated protocol may run on a computer that is separate from a computer on which the production service runs. To a threat actor, a production host in this embodiment may offer both SQL and SSH services. Within the infrastructure, the production SSH service may be running on the production machine, while traffic for the emulated SQL honeypot service is forwarded to another host in an isolated environment using, for example, iptables or other similar technologies.

The downside to this approach is that network latency may differentiate the honeypot services 206 on this machine 110 from the non-honeypot services 208 (providing the same functionality, SSH, SQL, etc) from its peer machines 112. However, this may be addressed by deploying production and honeypot hosts with adequate resources on an adjacent network that has enough bandwidth to satisfy the needs of the forwarded protocol. For example, a file transfer protocol would require more bandwidth than a database protocol.

Another or additional way to address the risk associated with colocating honeypot and non-honeypot services is to deploy and execute the honeypot emulated services on the same host as the production service. The honeypot service may function as a real production service. The honeypot service is, however, isolated to an underprivileged user. For administrative ports (below 1024), user rights are configured to redirect traffic to a non-privileged port or, for example, the capability of modern kernels is required.

Figure 3:
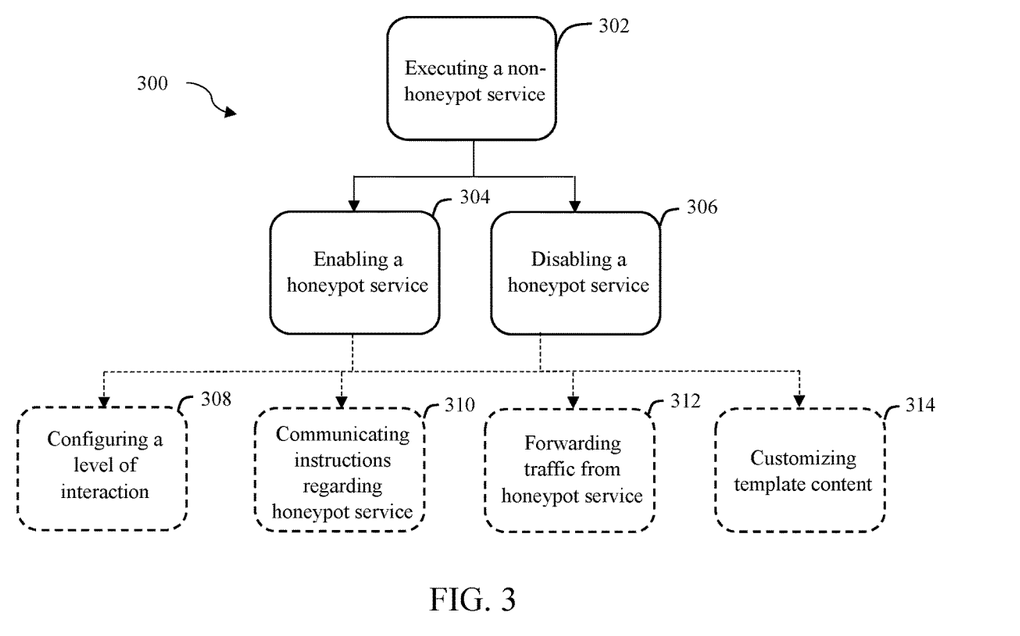
FIG. 3 depicts a flowchart of a method for monitoring activity on a network in accordance with one embodiment.

FIG. 3 depicts a flowchart of a method 300 for monitoring activity on a network in accordance with one embodiment. Step 302 involves executing, using at least one host computer on the network, a non-honeypot service. The host computer may be similar to the host computer 110 of FIGS. 1 and 2, for example, and the non-honeypot service may be a production service.

Steps 304 and 306 involve enabling or disabling, respectively, using a control module, a honeypot service on the at least one host computer in response to at least one of computational resource availability and configured tolerance for degraded service and acceptable risk. If a particular honeypot service is initially disabled, step 304 may be performed to enable this particular honeypot service. If a particular honeypot service is initially enabled, step 306 may be performed to disable this particular honeypot service.

Step 308 is optional and involves configuring, using the control module, a level of interaction provided by the honeypot service. As mentioned previously, the level of interaction provided by a host computer 110 and, namely, the non-honeypot services and honeypot services can be scaled up or down. They can be scaled to run in a purely observational mode, in a high interaction mode, or some hybrid thereof. This adjustment of the level of interaction may be performed autonomously or by an operator.

Step 310 is optional and involves communicating, using the at least one host computer, instructions regarding the deployment of a honeypot service on another host computer in response to an attack on the at least one host computer. Based on the behavior of one or more threat actors, for example, one or more honeypot services may be initiated on another host computer in a network. These instructions may be communicated from the configuration manager 108 directly to the other host computer.

For example, in some instances host computer 110 may have both honeypot and non-honeypot services running thereon, and host computer 112 may have only non-honeypot services running thereon. If the configuration manager 108 wants to enable honeypot services on host computer 112 (e.g., because the configuration manager 108 considers host computer 110 to be under attack), the configuration manager 108 may communicate directly with the host computer 112 to enable honeypot services.

Step 312 is optional and involves forwarding traffic from the honeypot service to a second host computer in an isolated environment. Accordingly, this traffic may be analyzed in isolation.

Step 314 involves customizing, using the honeypot service, template content for its communications with a threat actor. As mentioned previously, the one or more databases 116 may store template content related to production service content that may be customized to try to deceive threat actors. This content may include, but is not limited to, Telnet banners, SMB banners, database version indicia, database schemas, or the like.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A system for monitoring activity on a network, the system comprising:
    a single host computer configured to execute a non-honeypot service, wherein the single host computer executes one or more production services associated with the single host computer,
    the single host computer serves production service content generated by the one or more production services in response to a request from a device on the network, and the single host computer comprises a control module configured to:
        enable or disable a honeypot service in response to at least one of computational resource availability, configured tolerance for degraded service, and acceptable risk, and
        during enablement of the honeypot service, selectively scale the honeypot service among an observational mode in which it accepts network connections, an interaction mode in which it simulates network services, and a combination of the observational mode and the interaction mode.

2. The system of claim 1, further comprising:
    a configuration manager in communication with the single host computer permitting an operator to select the mode of the honeypot service.

3. The system of claim 1, wherein the single host computer is configured to communicate instructions regarding a deployment of a honeypot service on another host computer in response to an attack on the single host computer.

4. The system of claim 1, wherein the honeypot service on the single host computer is configured to forward traffic from the honeypot service to a second host computer in an isolated environment.

5. The system of claim 1, wherein the honeypot service is executed without escalated privileges on the single host computer.

6. The system of claim 1, wherein the honeypot service and the non-honeypot service share an assigned port, and the control module determines which of the honeypot service and the non-honeypot service is configured to communicate using the assigned port.

7. The system of claim 1, wherein the honeypot service is configured to customize template content for its communications with a threat actor.

8. The system of claim 7, wherein the template content is selected from the group consisting of Telnet banners, SMB banners, database versions, and database schemas.

9. A method for monitoring activity on a network, the method comprising:
- executing, using a single host computer, a non-honeypot service, wherein
  - the single host computer executes one or more production services associated with the single host computer, and
  - the single host computer serves production service content generated by the one or more production services in response to a request from a device on the network;
- enabling or disabling, using a control module, a honeypot service on the single host computer in response to at least one of computational resource availability, configured tolerance for degraded service, and acceptable risk; and
- during enablement of the honeypot service, selectively scale the honeypot service among an observational mode in which it accepts network connections, an interaction mode in which it simulates network services, and a combination of the observational mode and the interaction mode.

10. The method of claim 9, further comprising:
permitting, using a configuration manager in communication with the single host computer, an operator to select the mode of the honeypot service.

11. The method of claim 9, further comprising:
communicating, using the single host computer, instructions regarding a deployment of a honeypot service on another host computer in response to an attack on the single host computer.

12. The method of claim 9, further comprising:
forwarding traffic from the honeypot service to a second host computer in an isolated environment.

13. The method of claim 9, wherein the honeypot service is executed without escalated privileges on the single host computer.

14. The method of claim 9, wherein
the honeypot service and the non-honeypot service share an assigned port, and the control module determines which of the honeypot service and the non-honeypot service is configured to communicate using the assigned port.

15. The method of claim 9, further comprising:
customizing, using the honeypot service, template content for its communications with a threat actor.

16. The method of claim 15, wherein
the template content is selected from the group consisting of Telnet banners, SMB banners, database versions, and database schemas.

* * * * *